May 18, 1965  C. D. COCHRAN  3,183,920
PULSATOR FOR A MILKING MACHINE
Filed Sept. 26, 1962  3 Sheets-Sheet 1
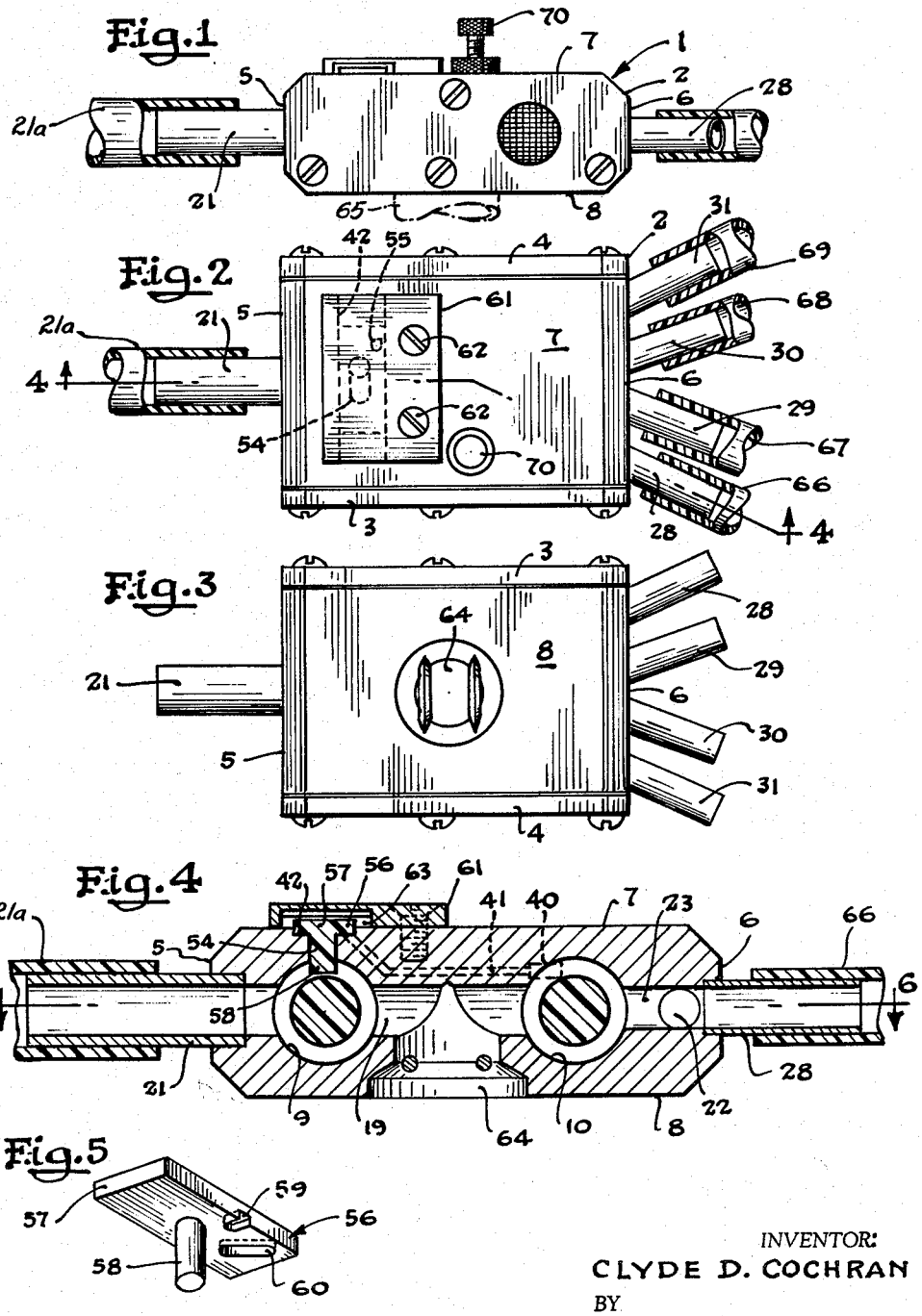
INVENTOR:
CLYDE D. COCHRAN
BY
Marzall, Johnston, Cook & Root
ATT'YS

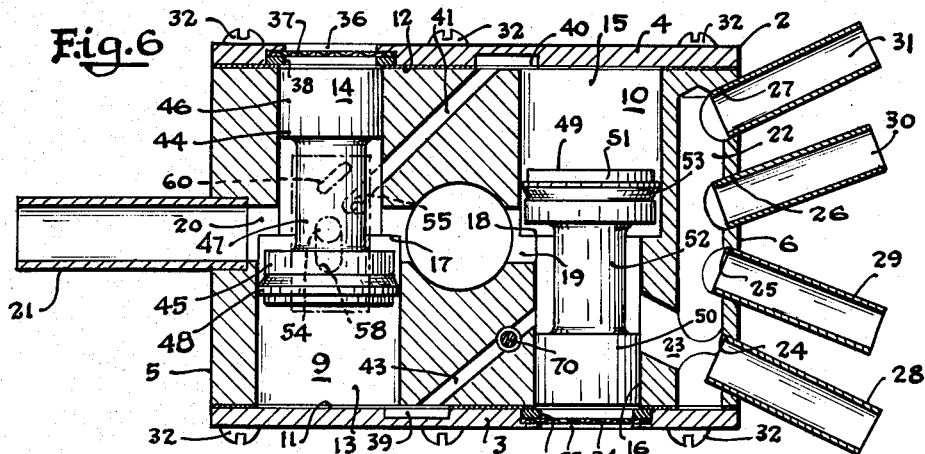
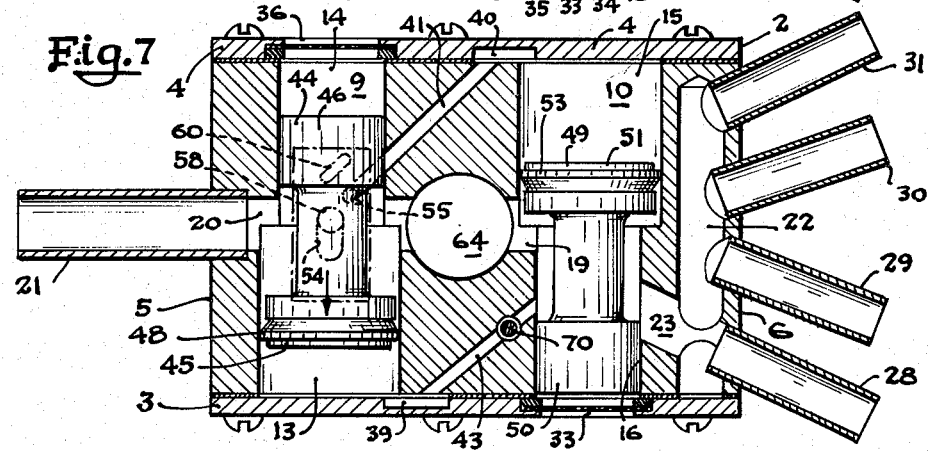
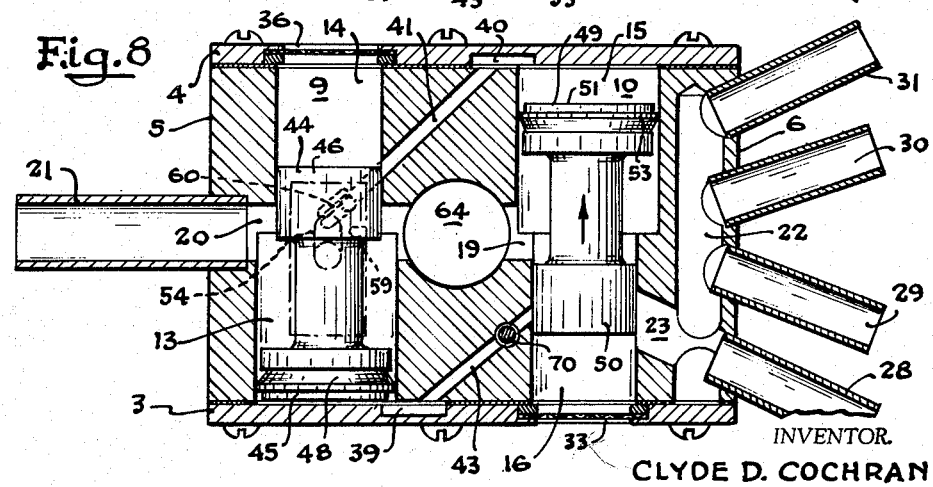

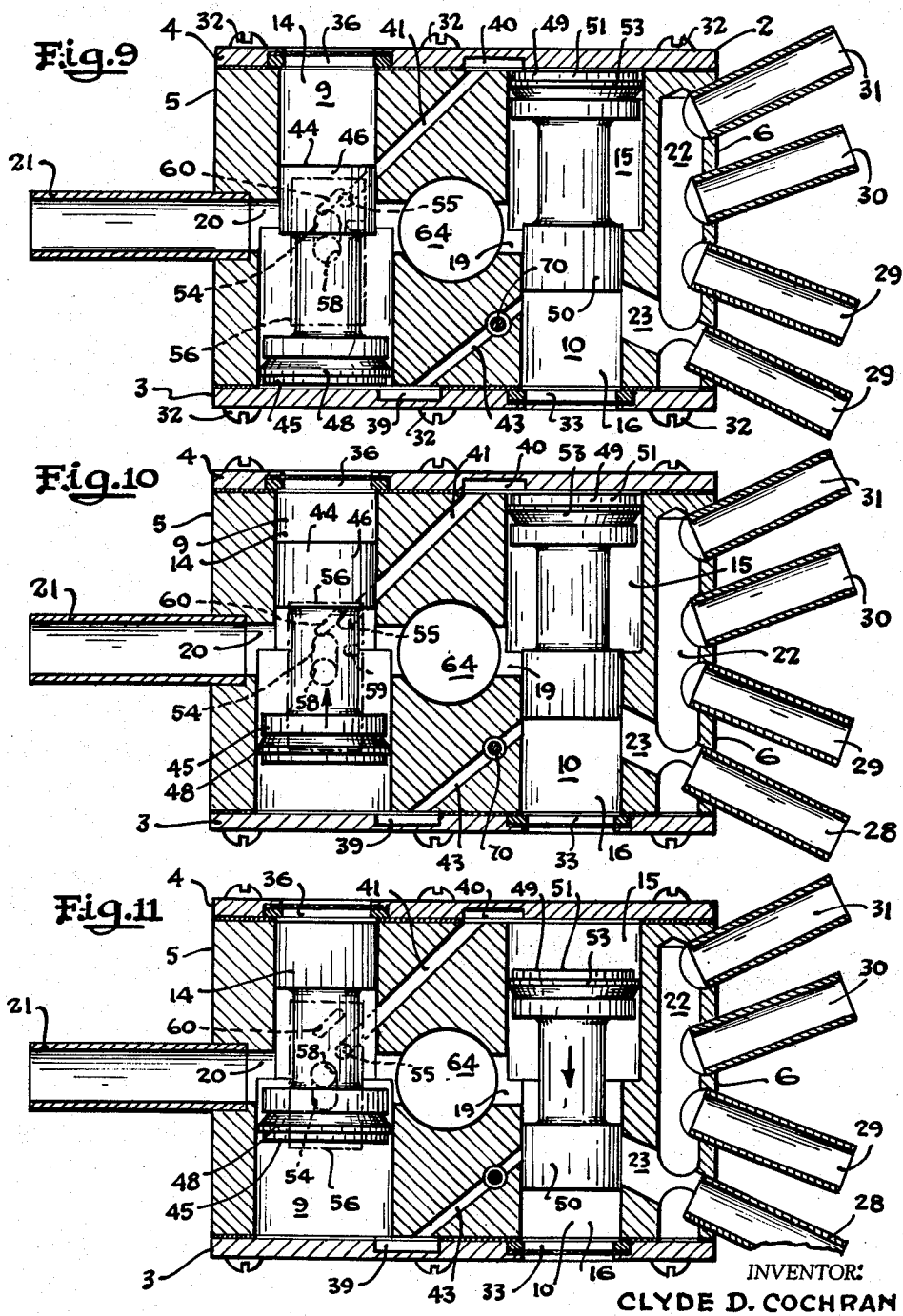

United States Patent Office 3,183,920
Patented May 18, 1965

3,183,920
PULSATOR FOR A MILKING MACHINE
Clyde D. Cochran, Deerfield Beach, Fla., assignor to U.S. Industries, Inc., New York, N.Y., a corporation of Delaware
Filed Sept. 26, 1962, Ser. No. 226,328
11 Claims. (Cl. 137—105)

This invention relates to milking machinery and, more particularly, to pulsators of the type particularly well adapted for use in milking machinery.

It is a primary object of the present invention to afford a novel pulsator for controlling the pressure differentials in the teat-cups of milking machines in a novel and expeditious manner.

Pulsators for use in milking machines, and the like, have been heretofore known in the art. However, such pulsators as have been heretofore known have had several inherent disadvantages such as, for example, affording operating conditions which caused inflammation of the teats of an animal being milked; being large and cumbersome in size; being complicated in construction and operation; being unreliable and inefficient in operation; or being difficult and expensive to produce commercially, and the like. It is an important object of the present invention to overcome such disadvantages.

In milking machines it is important that the vacuum in the teat cups be created and released rapidly so as to cause the gentle massaging action desired on the teats of the animal being milked. It is an object of the present invention to enable such rapid creation and release of the vacuum in teat cups of a milking machine to be effected in a novel and expeditious manner.

Pulsators embodying reciprocating pistons have been heretofore known in the art. However, such pulsators have commonly had several inherent disadvantages such as, for example, embodying a piston construction which required lubrication; embodying such construction that they were capable of effective and efficient operation only in a relatively narrow temperature range such as, for example, at temperatures between 60° F. and 90° F.; or being so constructed that moisture and detergents commonly used in cleaning the pulsators had such a deleterious effect thereon as to render the pulsators incapable of operating properly. It is another object of the present invention to overcome such disadvantages.

A further object of the present invention is to afford a novel pulsator of the aforementioned type embodying novel pistons constituted and arranged in a novel and expeditious manner.

Another object is to afford a novel pulsator of the aforementioned type embodying a novel piston ring construction.

A further object is to afford a novel pulsator of the reciprocating piston type which is automatic in operation, and wherein the reversal of the movements of the pistons thereof is effected in a novel and expeditious manner.

Another object is to afford a novel pulsator of the aforementioned type which may be quickly and easily cleaned.

Yet another object is to afford a novel pulsator of the aforementioned type which embodies novel control mechanism therefor.

A further object is to afford a novel pulsator of the aforementioned type which is practical and efficient in operation, and which may be readily and economically produced commercially.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

FIG. 1 is a side elevational view of a pulsator embodying the principles of the present invention;

FIG. 2 is a top plan view of the pulsator shown in FIG. 1;

FIG. 3 is a bottom plan view of the pulsator shown in FIG. 1;

FIG. 4 is a somewhat enlarged sectional view taken substantially along the line 4—4 in FIG. 2;

FIG. 5 is a detail bottom perspective view of a portion of the pulsator shown in FIG. 4;

FIG. 6 is a somewhat diagrammatic, longitudinal sectional view taken substantially along the line 6—6 in FIG. 4;

FIG. 7 is a view similar to FIG. 6, but showing certain parts in different operative position;

FIG. 8 is a view similar to FIG. 7, but showing certain parts in different operative position;

FIG. 9 is a view similar to FIG. 8, but showing certain parts in different operative position;

FIG. 10 is a view similar to FIG. 9, but showing certain parts in different operative position; and FIG. 11 is a view similar to FIG. 10, but showing certain parts in different operative position.

A pulsator 1, embodying the principles of the present invention, is shown in the drawings to illustrate the preferred embodiment of the present invention.

The pulsator 1 includes a housing or main body member 2, which is preferably made from a suitable corrosion-resistant metal such as, for example, stainless steel, or the like. The body member 2 is substantially rectangular in shape, and includes a front side wall 3 and a rear side wall 4, disposed in substantially parallel relation to each other; two substantially parallel end walls 5 and 6, extending between respective ends of the side walls 3 and 4 in substantially perpendicular relation thereto; and a top wall 7 and a bottom wall 8 disposed in substantially parallel relation to each other, and in substantially perpendicular relation to the walls 3–6, FIGS. 1–3.

The body portion 2 has two elongated, substantially straight cylinders 9 and 10 extending between the front wall 3 and the rear wall 4 in substantially parallel, spaced relation to each other, FIGS. 4 and 6–11. The cylinders 9 and 10 are disposed midway between the top wall 7 and the bottom wall 8, FIG. 4, with the cylinder 9 disposed adjacent to the end wall 5, and the cylinder 10 disposed adjacent to the end wall 6, FIGS. 6–11. The cylinders 9 and 10 terminate at their outer ends at the inner faces 11 and 12 of the front and rear walls 3 and 4, respectively.

The cylinder 9 has a relatively large front end portion disposed adjacent to the front wall 3 to afford a large cylinder chamber 13, and a relatively small rear end portion adjacent the rear wall 4 to afford a smaller cylinder chamber 14. The cylinder 10 has a relatively large rear end portion disposed adjacent to the rear wall 4 to thereby afford a relatively large cylinder chamber 15 at the rear end thereof, and a relatively small front end portion adjacent to the front wall 3 to thereby afford a smaller cylinder chamber 16 at the front end thereof. The chambers 13 and 14 of the cylinder 9 join each other midway between the walls 3 and 4, on the longitudinal center line of the body portion 2, to afford a forwardly facing shoulder 17. Similarly, the chambers 15 and 16 of the cylinder 10 join each other midway between the walls 3 and 4, along the longitudinal center line of the body portion 2, to afford a rearwardly facing shoulder 18.

A substantially straight, elongated passageway 19 extends between, and interconnects the longitudinal center portions of the cylinders 9 and 10. Another passageway 20 extends outwardly through the end wall 5 from the longitudinal center portion of the cylinder 9, and a suitable nipple or coupling member 21 is mounted in and projects outwardly from the passageway 20 to afford a connecting member for connecting the pulsator 1 to a suitable vacuum source, not shown, for a purpose which will be discussed in greater detail presently.

Another passageway 22 extends from the front wall 3 rearwardly toward the rear wall 4 in substantially parallel relation to the cylinders 9 and 10, FIGS. 4 and 6–11. The passageway 22 is disposed between the cylinder 10 and the end wall 6 and terminates at its rear end in inwardly spaced relation to the rear wall 4. Another passageway 23 extends between, and interconnects the passageway 22 and the longitudinal center portion of the smaller chamber 16 of the cylinder 10. Four passageways 24, 25, 26, and 27, which are spaced from each other longitudinally of the passageway 22 extend outwardly from the passageway 22 through the end wall 6, and four nipples or connecting members 28, 29, 30, and 31 are mounted in the outer ends of the passageways 24–27, respectively, and project outwardly therefrom to afford connecting members for connecting the pulsator 1 to the teats of a cow to be milked, as will be discussed in greater detail presently.

The front wall 3 and the rear wall 4 are preferably substantially flat, removable members, which are releasably secured in their respective operative positions on the body member 2 by suitable means such as screws or bolts 32. The front wall 3 has an opening 33 extending therethrough in axial alignment with the cylinder 10, a suitable filter member 34 being disposed in the opening 33, and secured in operative position therein by suitable means such as, for example, a retainer ring 35. The retainer ring 35 is disposed inwardly of the filter screen 34 and is of smaller inside diameter than the diameter of the chamber 16 of the cylinder 10. Similarly, the rear wall 4 has an opening 36 extending therethrough in axial alignment with the cylinder 9, a filter screen 37 being mounted in the opening 36 and secured in operative position therein by suitable means such as a retainer ring 38. The retainer ring 38 is disposed inwardly of the filter screen 37 and has an inside diameter which is smaller in diameter than the diameter of the chamber 14 of the cylinder 9. Thus, it will be seen that the smaller ends of the cylinders 9 and 10 are open to the atmosphere through the openings 36 and 33, respectively.

Two elongated, substantially rectangular-shaped recesses 39 and 40 are formed in the inner faces of the front wall 3 and the rear wall 4, respectively, with one end of the recesses 39 and 40 disposed in communication with the upper edge portion of the large chambers 13 and 15 of the cylinders 9 and 10, respectively, FIGS. 4 and 6–11. Another elongated passageway 41 extends from the other end portion of the recess 40 and opens outwardly through the top wall 7 in an elongated, substantially rectangular-shaped groove or recess 42 formed in the top wall 7 directly above the cylinder 9, FIGS. 2 and 4. Another elongated passageway 43 extends between and interconnects the other end portion of the recess 39 and the longitudinal center portion of the smaller chamber 16 of the cylinder 10, FIGS. 6–11. The passageways 41 and 43 are disposed in that part of the body portion 2 which is disposed above the plane of the longitudinal center lines of the cylinders 9 and 10.

An elongated piston 44 is slidably mounted in the cylinder 9 for reciprocation therein. The piston 44 has a large piston head 45 on one end thereof and a small piston head 46 on the other end thereof, with an intermediate portion or stem 47 of reduced cross-sectional size extending between the heads 45 and 46, FIGS. 6–11. The smaller head 46 of the piston 44 is mounted in the smaller chamber 14 of the cylinder 9 in freely slidable, fluid-type relation thereto. The larger head 45 of the piston 44 has a piston ring or sealing ring 48 mounted in the outer periphery thereof and projecting radially outwardly therefrom, and the larger head 45 is disposed in the larger chamber 13 of the cylinder 9 in freely slidable relation thereto, with the sealing ring 38 disposed in fluid-tight relation to the side walls of the chamber 13. Another piston 49, which is identical in construction to the piston 44 is slidably mounted in the cylinder 10 for longitudinal reciprocation therein. Like the piston 44, the piston 49 includes a small head 50 at one end thereof and a large head 51 at the other end thereof with an intermediate portion or stem 52 of reduced cross-sectional size extending between and interconnecting the heads 50 and 51, and with the large head 51 having a piston ring or sealing ring 53 mounted in the outer periphery thereof and projecting radially outwardly therefrom. The smaller head 50 of the piston 49 is slidably mounted in the smaller chamber 16 of the cylinder 10 in freely slidable, fluid-tight relation thereto, and the larger head 51 of the piston 49 is disposed in the larger chamber 15 of the cylinder 10 in freely slidable relation thereto, with the sealing ring 53 disposed in fluid-tight relation to the chamber 15.

The pistons 44 and 49 are of such length, and the heads 45, 46, 50, and 51 are so disposed thereon, that, when the heads 46 and 50 are disposed in abutting relation to the retainer rings 38 and 35 in the rear wall 4 and the front wall 3, respectively, the other heads 45 and 51 are disposed in spaced relation to the walls 3 and 4 and to the shoulders 17 and 18, respectively, FIG. 6; and when the heads 45 and 51 are disposed in abutting engagement with the walls 3 and 4, respectively, the other heads 46 and 50 are disposed in spaced relation to the walls 4 and 3 and project into the larger chambers 13 and 15, respectively, FIG. 9. Also, the piston 49 is of such size, and the head 50 is so disposed thereon, that when the piston 49 is disposed in forwardmost position in the cylinder 10, the rear end of the head 50 is disposed forwardly of the end portions of the passageways 23 and 43 which open into the chamber 16, as shown in FIG. 6; and when the piston 49 is disposed in rearwardmost position, the forward end 50 thereof is disposed rearwardly of the end portion of the passageways 23 and 43 which open into the chamber 16, as shown in FIG. 9.

An elongated opening 54 extends through the top wall 7 directly above the cylinder 9 in substantially parallel relation to the longitudinal axis of the cylinder 9, FIGS. 2 and 4. The opening 54 extends along the longitudinal center line of the recess 42 formed in the upper face of the top wall 7, and is disposed substantially midway between the front wall 3 and the rear wall 4. The end 55 of the passageway 41, which opens outwardly through the top wall 7, is disposed rearwardly and to the right of the opening 54, as viewed in FIG. 2.

A substantially T-shaped slide 56 is slidably mounted on the top wall 7 of the body member 2 of the pulsator 1, FIGS. 2 and 4. The slide 56 includes a substantially flat, rectangular-shaped head portion 57 from the center portion of which depends a body portion or shank 58, FIG. 5. The head portion 57 is complementary in width to the recess 42 in the top wall 7, and is disposed in and slidable along the recess 42, with the shank 58 projecting downwardly through the recess 54, FIG. 4. The slide 56 has two elongated recesses 59 and 60 formed in the lower face thereof in spaced relation to each other. The recess 59, which is deeper than the recess 42 in the top wall 7, extends outwardly through one longitudinal edge of the head 57, and is so disposed on the head 57, that when the slide 56 is disposed in rearwardmost position in the recess 42, FIG. 6, wherein the shank 58 is disposed in engagement with the end of the recess 54 facing toward the rear wall 4, the recess 59 is disposed in direct communication with the end 55 of the passageway 41, for a purpose which will be discussed in greater detail presently. The recess 60, which is spaced from the edges of the slide 56, is disposed in such position in the head 57 of the slide 56 that when the slide 56 is disposed in forwardmost position, FIG. 8, wherein the shank 58 is disposed in engagement with the front end of the opening 54 facing toward the front wall 3, one end of the recess 60 is disposed in direct communication with the end 55 of the passageway 41, and the other end of the recess 60 is disposed in direct communication with the rear end of the opening 54 through the top wall 7.

When the slide 56 is disposed in operative position on the top wall 7, the lower face of the head 57 is disposed in fluid-tight juxtaposition to the upper face of the recess 42. A cover plate 61 is secured to the upper face of the top wall 7 of the body member 2 by suitable means such as, screws or bolts 62, in overlying retaining position to the slide 56. The cover member 61 has a substantially rectangular-shaped downwardly opening recess 63 formed therein which is disposed directly above the recess 42 in parallel relation thereto. The recess 63 is of substantially greater width than the recess 42 and extends the full length of the cover member 61 to thereby afford air passageways through the cover 61 along the longitudinal edges of the slide 56, for a purpose which will be discussed in greater detail presently.

A discharge opening 64 extends from the passageway 19 outwardly through the bottom wall 8 of the body portion 2 of the pulsator 1 midway between the cylinders 9 and 10 for discharging milk from the pulsator 1 during a milking operation. The discharge opening 64 is at all times in communication with the coupling member 21, through the passageway 19, the longitudinal center portion of the cylinder 9, and the passageway 20, so that, whenever a vacuum is created in the coupling member 21, the discharge opening 64 is subjected to that vacuum.

In the operation of the novel pulsator 1, the nipple 21 may be connected in the usual manner by a suitable conduit 21a, FIGS. 1, 2, and 4, to a suitable vacuum line or vacuum pump, not shown, and the nipples 28–31 may be connected in the usual manner by suitable conduits 66, 67, 68, and 69, respectively, to the respective teat cups of a milking machine, not shown, and the teat cups may be mounted in the usual operative position on the teats of an animal to be milked. Thereafter, the vacuum in the pulsator 1 causes the pistons 44 and 49 to automatically reciprocate in the cylinders 9 and 10, respectively, to thereby cause a vacuum to be created and released in the nipples 28–31 and, therefore, in the teat cups to which they are connected, as will be discussed in greater detail presently. Such alternate creation and release of vacuum in the nipples 28–31 is effective to cause milk to flow from the teats of the animal being milked into the body portion 2 of the pulsator 1 and discharged therefrom through the outlet opening 64. The outlet opening 64 may be connected by a suitable connecting member such as, for example, the member 65 shown in FIG. 1 to a suitable discharge receptacle such as, for example, a suitable pail or discharge line, not shown.

In such an operation of the pulsator 1, first one and then the other of the pistons 44 and 49 is caused to move longitudinally in the cylinders 9 and 10, respectively. Thus, for example, with the pistons 44 and 49 disposed in the position shown in FIG. 6, the vacuum in the nipple 21 is effective to create a vacuum through the passageway 20, the intermediate portion of the cylinder 9 rearwardly of the large head 45 of the piston 44, the passageway 19, the intermediate portion of the cylinder 10 rearwardly of the small head 50 of the piston 49, the passageway 23, and the passageway 22 to the nipples 28–31 to thereby create a vacuum in the teat cups attached to the animal being milked. With the piston 49 disposed in its forwardmost position in cylinder 10, as shown in FIG. 6, the vacuum in the cylinder 10 is effective through the passageway 43 and the recess 39 to create a vacuum in the front end of the cylinder 9. The rear end of the cylinder 9 being open to the atmosphere through the opening 36, the piston 45 is thus forced forwardly in the cylinder 9 from the piston shown in FIG. 6 toward the position shown in FIG. 8.

During the initial forward movement of the piston 44 from rearwardmost position, the slide 56 is disposed in rearwardmost position, as shown diagrammatically in broken lines in FIG. 6, with the recess 59 disposed in direct communication with the end 55 of the passageway 41. It will be remembered that the recess 59 is of greater depth than the recess 42 in the top wall 7 of the body portion 2. Hence, at all times, the recess 59 is in direct communication with the passageway 63 through the cover plate 61, and, therefore, is open to the atmosphere. Thus, with the slide 56 disposed in the aforementioned rearwardmost position, the large chamber 15 of the cylinder 10 is open to the atmosphere through the recess 40, the passageway 41, the recess 59, and the passageway 63.

As the piston 44 moves forwardly from the rearwardmost position shown in FIG. 6, through the intermediate position shown in FIG. 7, into the forwardmost position shown in FIG. 8, the front end of the small head 46 of the piston 44, just prior to completion of the forward movement of the piston 44, moves into engagement with the shank 58 of the slide 56. As the piston 44 moves into its aforementioned forwardmost position, as shown diagrammatically in broken lines in FIG. 8, the head 46 is effective to move the slide 56 into its forwardmost position, wherein the recess 60 is in direct communication with the end 55 of the passageway 41, and the slot 54 formed in the top wall 7 of the body portion 2 of the pulsator 1. This is effective to connect the chamber 15 of the cylinder 10 of the intermediate portion of the cylinder 9, and thereby subject the chamber 15 to the vacuum created in the intermediate portion of the cylinder 9 by the vacuum in the nipple 21. The connection between the chamber 15 of the cylinder 10 and the intermediate portion of the cylinder 9 is afforded by the recess 40 in the rear wall 4, the passageway 41, the recess 60 in the slide 56, and the opening 54 in the top wall 7 of the body portion 2. The forward end of the cylinder 10 being open to the atmosphere through the opening 33, when the vacuum is thus created in the chamber the forward end of the piston 49 is effective to move the latter rearwardly in the cylinder 10. As the piston 49 moves into rearwardmost position, the small head 50 thereof moves forwardly past the ends of the passageways 23 and 43, which open into the cylinder 10. This opens the passageway 43 and the passageway 23 to atmosphere. The opening of the passageway 23 to atmosphere releases the vacuum in the nipples 28–31, to thereby release the vacuum in the teat cups attached to the animal being milked. The opening of the passageway 43 to the atmosphere opens the large chamber 13 of the cylinder 9, forwardly of the piston 44 to the atmosphere for a purpose which will be discussed in greater detail presently.

It will be remembered that the piston 44 is of such size, and the heads 45 and 46 thereof are disposed in such position thereon that in all positions of the piston 44 the passageway 19 is in communication with the nipple 21 through the intermediate portion of the cylinder 9 and the passageway 20, so that at all times during the operation of the pulsator 1 the vacuum in the nipple 21 is effective to maintain a vacuum in the passageway 19 and the outlet opening 64, to thereby maintain a vacuum in the receptacle for the milk, not shown, so that when vacuum is applied through the pulsator 1 to the nipples 28–31, milk may flow from the teats of the animal into the receptacle for the milk.

It will be remembered that when the piston 49 reaches its rearwardmost position in cylinder 10, as shown in FIG. 9, the forward end of the chamber 13 of the cylinder 9 is open to the atmosphere, the passageway for opening the cylinder 9 to the atmosphere extending to the chamber 13 through the recess 39 in the front cover 3, the passageway 43, the small chamber 16 of the cylinder 10, and the opening 33 in the front cover 3. Under these conditions, both ends of the piston 44 are subjected to atmospheric pressure. At the same time, with the piston 44 disposed in the position shown in FIG. 9, the front end of the small head 46 of the piston 44 and the rear end of the large head 45 of the piston 44 are also subjected to the vacuum created in the intermediate portion of the cylinder 9 by the vacuum in the nipple 21. This is effective to create a pressure differential which is effective to cause the piston 44 to move rearwardly from its forwardmost position shown in FIG. 9, through the position shown in FIG. 10 into its rearwardmost position shown in FIG. 11. Toward the end of this rearward movement of the piston 44 the rear end of the large head 45 thereof engages the shank 58 of the slide 56 and moves the slide 56 rearwardly along the recess 42 into its aforementioned rearwardmost position, wherein the recess 59 is again in direct communication with the end 55 of the passageway 41. This again opens the rear end of the large chamber 15 of the cylinder 10 to atmosphere, the passageway for accomplishing this extending from the rear end of the cylinder 10 through the recess 40 in the rear wall 4, the passageway 41, the recess 59 in the slide 56, and the passageway 63 in the cover member 61. Under these conditions, both ends of the piston 49 are subjected to atmospheric pressure, and the front face of the large head 51 of the piston 49, and the rear face of the small head 50 of the piston 49 are subjected to the vacuum created in the intermediate portion of the cylinder 10. This creates a pressure differential on the piston 49 which is effective to move the piston 49 forwardly from the position shown in FIG. 10, through the position shown in FIG. 11 back into the position shown in FIG. 6, to thereby complete a cycle of operation. During this latter movement of the piston 49, the small head 50 thereof again moves forwardly of the inner ends of the passageways 43 and 23, to again connect these passageways to the intermediate portion of the cylinder 10, and thereby create a vacuum in the passageways 43 and 23. The creation of the vacuum in the passageway 23 is effective to create a vacuum in the nipples 28–31, and thereby again create a vacuum in the teat cups attached to the animal being milked. The creation of the vacuum in the passageway 43 is again effective to create a vacuum in the front end portion of the cylinder 9 and thus start another cycle of operation of the pulsator 1.

The pulsator 1 includes needle valve 70, FIGS. 1, 2, and 6–11, adjustably mounted in the top wall 7 of the body portion 2, the needle valve 70 extending into the passageway 43, and affording means by which the effective cross-sectional size of the passageway 43 may be adjusted to thereby control the flow of air therethrough. By controlling the flow of air through the passageway 43, the speed of reciprocation of the pistons 44 and 49 in the cylinders 9 and 10 may be effectively controlled.

Pulsator units of the reciprocating-piston type heretofore known in the art have commonly embodied constructions which included leather seal rings on the pistons thereof. Such constructions have certain disadvantages, such as, for example, requiring that the cylinder walls be lubricated. In addition, the liquid and detergents commonly used in cleaning such pulsator units have such a deleterious effect on such piston constructions that such pulsator units have commonly been rendered inoperative thereby in relatively short periods of use. Also, it has been heretofore commonly found that although piston-type pulsators heretofore known may work very efficiently at ordinary temperature ranges such as, for example, in temperature ranges between 60 degrees and 90 degrees Fahrenheit, they were not reliable in operation at temperature above 90 degrees and temperatures below 60 degrees.

The present invention affords a novel pulsator which does not require lubrication of the cylinder walls. It also affords a novel pulsator wherein the parts are so constituted and arranged that the pulsator may be readily cleaned and the piston and cylinder assemblies therein are substantially impervious to damage by the liquids and detergents commonly used in such cleaning. In addition, the present invention affords a novel pulsator which operates very satisfactorily and efficiently at temperatures far above and far below temperatures of from 60° F. to 90° F., the temperature range which is commonly now considered to be the normal temperature range within which pulsators may be relied upon to operate satisfactorily.

One of the features of the present invention is the manner in which the pistons are constructed. I have found that when the pistons 44 and 49 are constructed of a suitable plastic material, which has the characteristic of being dimensionally stable throughout the desired temperature range of operation and which material is relatively hard and highly corrosion resistant; and when the seal rings or piston rings 48 and 53 are made from a suitable plastic material, which has a low coefficient of friction, is tough, and has the ability to return to its normal position and configuration after being deformed, the pulsator 1 will operate effectively and efficiently at extremely low and extremely high temperatures, requires no lubrication, and is substantially impervious to the deleterious effects of moisture and detergents. For these purposes, I prefer that the pistons 44 and 49 be made of polypropylene, and that the piston rings 48 and 53 may be made of a suitably polymer of tetrafluorethylene, such as that presently available on the market under the trademark, Teflon.

From the foregoing it will be seen that the present invention affords a novel pulsator which is fully automatic in operation.

Also, the present invention affords a novel piston construction for pulsators, and the like.

In addition, it will be seen that the present invention affords a novel pulsator which is effective and efficient in operation and may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A pulsator for milking machines comprising
    (a) a body member,
    (b) means for connecting one side portion of said body member to the teats of a cow to be milked,
    (c) means for connecting another side portion of said body member to a source of vacuum,
    (d) said body member having a discharge outlet for discharging milk therefrom,
    (e) said discharge outlet being in communication with said second-mentioned means at all time, and
    (f) third means for alternately connecting said first-mentioned means
        (1) to atmosphere and
        (2) to said discharge outlet and, therefore, to said second-mentioned means,
    (g) said third means including (1) one cylinder operatively connected between said second-mentioned means and said discharge outlet,
(2) a second cylinder operatively connected between said first-mentioned means and said discharge outlet,
(3) pistons reciprocably mounted in said cylinders, and
(4) means, including a slide operable by one of said pistons, for controlling the reciprocation of said pistons in said cylinders.

2. A pulsator for milking machines comprising
(a) a body member,
(b) means for connecting one side portion of said body member to the teats of a cow to be milked,
(c) means for connecting another side portion of said body member to a source of vacuum,
(d) said body member having a discharge outlet for discharging milk therefrom,
(e) said discharge outlet being in communication with said second-mentioned means at all times, and
(f) third means for alternately connecting said first-mentioned means
    (1) to atmosphere and
    (2) to said discharge outlet and, therefore, to said second-mentioned means,
(g) said third means including
    (1) one elongated cylinder disposed in said body member and having a longitudinal center portion in communication with said discharge outlet and said second-mentioned means at all times,
    (2) a second elongated cylinder disposed in said body member and having
        (a') a longitudinal center portion in communication with said discharge outlet at all times and
        (b') one end portion on communication with said first-mentioned means at all times,
    (3) two pistons slidably mounted in respective ones of said cylinders for reciprocation between the ends thereof, and
    (4) a slide on said body member and reciprocable by said piston in said one cylinder for controlling said reciprocation of said pistons,
(h) said piston in said second cylinder being disposed in position
    (1) to close communication between said discharge outlet and said first-mentioned means when disposed at the other end of said second cylinder and
    (2) to open communication between said discharge outlet and said first-mentioned means when disposed at said one end of said second cylinder.

3. A pulsator as defined in claim 2, and
(a) in which said body member has a passageway therethrough with one end opening into said other end of said second cylinder and another end opening outwardly through a side portion of said body member, and
(b) which includes means, including said slide, for alternately connecting said other end of said passageway to said center portion of said one cylinder and to atmosphere.

4. A pulsator for milking machines comprising
(a) a body portion having
    (1) two susbtantially straight elongated cylinders therein,
(b) each of said cylinders having one end which is open to the atmosphere at all times,
(c) two pistons,
(d) each of said pistons being reciprocably mounted in a respective one of said cylinders for reciprocation therein through the longitudinal center portion of said respective cylinder,
(e) a passageway extending between said center portions and, at all times, directly connecting said center portions in direct communication with each other,
(f) a vacuum line directly connected at all times to said center portion of one of said cylinders,
(g) a second passageway in direct communication with said one end portion of the other of said cylinders,
(h) means for connecting said second passageway to the teats of a cow to be milked,
(i) a third passageway connecting said one end portion of said other cylinder to the other end of said one cylinder,
(j) a fourth passageway having
    (1) one end directly connected to the other end of said other cylinder, and
    (2) another end opening outwardly through one side of said body portion,
(k) said pistons being reciprocable between
    (1) one position wherein
        (a') said one piston is disposed at said one end of said one cylinder, and
        (b') said other piston is disposed at said one end of said other cylinder in position to open said other cylinder between said center portion thereof and said second and third passageways to thereby connect said connecting means and said other end of said one cylinder to said vacuum line, and
    (2) a second pistion wherein
        (a') said one piston is disposed at said other end of said one cylinder, and
        (b') said other piston is disposed at said other end of said other cylinder in position to
            (1') close said other cylinder between said center portion thereof and said second and third passageways, and
            (2') open said other cylinder between said one end thereof and said second and third passageways to thereby connect said connecting means and said other end of said one cylinder to atmosphere,
(l) a fifth passageway having one end opening into said center portion of said one cylinder and another end opening outwardly through said side of said body portion,
(m) and means for controlling said reciprocation of said pistons,
(n) said last-mentioned means including a slide,
(o) said slide having two recesses therein, and having
    (1) one position wherein one of said recesses connects said other end of said fourth passageway to atmosphere,
    (2) a second position wherein the other of said recesses connects said other end of said fourth passageway to said fifth passageway, and
    (3) a third position wherein said slide closes said other ends of both said fourth and fifth passageways, and
(p) means including said one piston for reciprocating said slide through said third position between said one position and said second position.

5. A pulsator as defined in claim 4 and in which
(a) each of said pistons includes a large head and a small head interconnected by a reduced intermediate portion, and
(b) said pistons are disposed in the respective ones of said cylinders with said small heads facing toward said respective one ends thereof.

6. A pulsator as defined in claim 4 and which includes
(a) control means adjustably mounted in said third passageway for adjusting the cross-sectional size of said third passageway to thereby control the speed of reciprocation of said pistons.

7. A pulsator as defined in claim 4 and in which
(a) said slide includes a member (1) extending through said fifth passageway into said center portion of said one cylinder, and
(2) reciprocable in said passageway during said reciprocation of said slide, and
(b) said one piston includes means operatively engageable with said member during said reciprocation of said one piston for so reciprocating said slide.

8. A pulsator as defined in claim 7, and in which
(a) said slide is disposed in said one position when said one piston is disposed at said one end of said one cylinder, and
(b) said slide is disposed in said second position when said one piston is disposed at said other end of said one cylinder.

9. A pulsator as defined in claim 4, and which includes
(a) a cover member mounted on said side of said body member in covering relation to said slide,
(b) and in which
(1) said cover member has an elongated slideway therein, and
(2) said slide is disposed in said slideway and is reciprocable therealong between said one position and said second position.

10. A pulsator as defined in claim 4 and in which
(a) said cylinders are disposed in substantially parallel relation to each other, with said one end thereof facing in opposite directions.

11. A pulsator for milking machines comprising
(a) a body member,
(b) means for connecting one side portion of said body member to the teats of a cow to be milked,
(c) means for connecting another side portion of said body member to a source of vacuum,
(d) said body member having a discharge outlet for discharging milk therefrom,
(e) said discharge outlet being in communication with said second-mentioned means at all times, and
(f) third means for alternately connecting said first-mentioned means
(1) to atmosphere and
(2) to said discharge outlet and, therefore, to said second-mentioned means,
(g) said third means including
(1) one elongated cylinder disposed in said body member and having a longitudinal center portion in communication with said discharge outlet and said second-mentioned means at all times,
(2) a second elongated cylinder disposed in said body member and having
(a') a longitudinal center portion in communication with said discharge outlet at all times and
(b') one end portion in communication with said first-mentioned means at all times,
(3) two pistons slidably mounted in respectively ones of said cylinders for reciprocation between the ends thereof, and
(4) a slide on said body member and reciprocable by said one piston in said one cylinder for controlling said reciprocation of said pistons,
(h) said piston in said second cylinder being disposed in position
(1) to close communication between said discharge outlet and said first-mentioned means when disposed at the other end of said second cylinder and
(2) to open communication between said discharge outlet and said first-mentioned means when disposed at said one end of said second cylinder,
(i) said one end of said second cylinder and one end of said one cylinder being open to atmosphere, and
(j) said first-mentioned means being open to atmosphere through said one end of said second cylinder when said piston in said second cylinder in disposed at said other end of said second cylinder.

References Cited by the Examiner
UNITED STATES PATENTS

| | | | |
|---|---|---|---|
| 1,376,804 | 5/21 | Fosler | 251—62 X |
| 2,333,019 | 10/43 | Lemm | 251—62 X |
| 2,419,844 | 4/47 | McArthur | 137—105 |
| 2,447,688 | 8/48 | Dinesen | 251—62 X |
| 2,489,563 | 11/49 | Dinesen | 137—105 |
| 2,517,327 | 8/50 | Lemm | 137—105 |
| 2,646,058 | 7/53 | Thomas | 137—103 |
| 2,827,920 | 3/58 | Rawson | 137—103 X |
| 2,977,987 | 4/61 | Maynard | 251—368 X |
| 2,991,972 | 7/61 | Busby | 251—175 |

ISADOR WEIL, *Primary Examiner.*
CLARENCE R. GORDON, *Examiner.*

UNITED STATES PATENT OFFICE
CERTIFICATE OF CORRECTION

Patent No. 3,183,920                                       May 18, 1965

Clyde D. Cochran

It is hereby certified that error appears in the above numbered patent requiring correction and that the said Letters Patent should read as corrected below.

Column 4, line 46, for "and" read -- end --; column 10, line 28, for "pistion" read -- position --; column 12, line 8, for "respectively" read -- respective --; same column 12, line 27, for "in", second occurrence, read -- is --.

Signed and sealed this 23rd day of November 1965.

(SEAL)
Attest:

ERNEST W. SWIDER                                  EDWARD J. BRENNER
Attesting Officer                                        Commissioner of Patents